United States Patent [19]

Kato et al.

[11] 4,237,845
[45] Dec. 9, 1980

[54] INTERNAL COMBUSTION ENGINE WITH AN AUXILIARY COMBUSTION CHAMBER

[75] Inventors: Takashi Kato, Susono; Toshio Tanahashi, Toyota, both of Japan

[73] Assignee: Toyota Jidosha Kogyo Kabushiki Kaisha, Toyota, Japan

[21] Appl. No.: 864,637

[22] Filed: Dec. 27, 1977

[30] Foreign Application Priority Data

Oct. 11, 1977 [JP] Japan .................. 52-120897

[51] Int. Cl.³ .................................. F02B 19/16
[52] U.S. Cl. ...................... 123/271; 123/263; 123/289
[58] Field of Search .......... 123/191 S, 191 A, 32 SP, 123/32 AA, 32 C, 191 R

[56] References Cited

U.S. PATENT DOCUMENTS

| | | | |
|---|---|---|---|
| 2,065,025 | 12/1936 | Ricardo | 123/32 AA |
| 2,106,914 | 2/1938 | L'Orange | 123/191 A |
| 2,120,768 | 6/1938 | Ricardo | 123/32 AA |
| 3,044,454 | 7/1962 | Sutton | 123/32 C |
| 3,799,140 | 3/1974 | Vogelsang et al. | 123/191 S |
| 3,820,523 | 6/1974 | Showalter et al. | 123/191 A |
| 4,004,563 | 1/1977 | Nakamura et al. | 113/191 S |
| 4,057,038 | 11/1977 | Reichel et al. | 123/32 AA |
| 4,075,999 | 2/1978 | Davis | 123/191 A |
| 4,108,133 | 8/1978 | Konishi et al. | 123/191 S |

FOREIGN PATENT DOCUMENTS

2543401 1/1977 Fed. Rep. of Germany ....... 123/191 S

*Primary Examiner*—Craig R. Feinberg
*Attorney, Agent, or Firm*—Kenyon & Kenyon

[57] ABSTRACT

An internal combustion engine comprising a main combustion chamber and an auxiliary combustion chamber are interconnected to each other via at least one connecting passage. The auxiliary combustion chamber and the connecting passage are formed in an auxiliary chamber component which is press-fitted into the recess formed in the cylinder head. The spark plug is located in the connecting passage. The inner wall of the connecting passage is covered by a heat insulation member which is made of a heat resistable material such as Invar for ensuring the stable growth and the non-extinguishment of the flame of combustible mixture ignited by the spark plug.

15 Claims, 9 Drawing Figures

INTERNAL COMBUSTION ENGINE WITH AN AUXILIARY COMBUSTION CHAMBER

DESCRIPTION OF THE INVENTION

The present invention relates to an internal combustion engine equipped with an auxiliary combustion chamber.

As an internal combustion engine capable of reducing fuel consumption while suppressing the production of harmful components in the combustion process, an engine has been proposed in which a combustion chamber comprises a main combustion chamber and an auxiliary combustion chamber interconnected to each other via a connecting passage with the spark plug being arranged in the connecting passage or in the auxiliary combustion chamber. In this engine, at the time of the intake stroke, a lean air-fuel mixture or a mixture containing a large amount of recirculated exhaust gas therein is introduced into the main combustion chamber. Then, at the time of the compression stroke, a combustible mixture introduced into the main combustion chamber is forced into the auxiliary combustion chamber via the connecting passage. After this, the combustible mixture in the auxiliary combustion chamber is ignited by the spark plug, and a burning jet is thus injected into the main combustion chamber from the auxiliary combustion chamber. As a method for further reducing fuel consumption while further reducing the amount of harmful components produced in the combustion chamber in an engine of this type, there is a method which uses a considerably lean air-fuel mixture or an air-fuel mixture of an approximately stoichiometric air-fuel ratio, which mixture contains a considerably large amount of the recirculated exhaust gas therein. However, the propagation speed of the flame of a combustible mixture becomes low as the air-fuel ratio of the combustible mixture becomes lean or as the amount of the recirculated exhaust gas is increased. Consequently, if a considerably lean air-fuel mixture or an air-fuel mixture containing a considerably large amount of the recirculated exhaust gas therein is used in an engine of the above-mentioned type, the flame of the combustible mixture ignited by the spark plug and located in the connecting passage is cooled by the inner wall of the connecting passage, which has a relatively low temperature, and thus the flame is extinguished before it can grow any larger. This condition creates the problem of misfires occurring in the engine.

An object of the present invention is to provide an internal combustion engine equipped with an auxiliary combustion chamber, which is capable of ensuring ignition and a stable growth of the flame even if a considerably lean air-fuel mixture or an air-fuel mixture containing a considerably large amount of the recirculated exhaust gas therein is used.

According to the present invention, there is provided an internal combustion engine comprising: a main combustion chamber; a cylinder head positioned over one end of the chamber and having therein a recess opening into the chamber; an intake valve movably mounted on the cylinder head for leading a combustible mixture into the main combustion chamber; an exhaust valve movably mounted on the cylinder head for discharging exhaust gas into the atmosphere; a heat resistable component disposed in the recess and having therein an auxiliary combustion chamber and a connecting passage for communicating the auxiliary combustion chamber with the main combustion chamber; a spark plug having a spark gap located in the connecting passage, and a heat insulator formed by a separate member different from the auxiliary combustion chamber and arranged to extend in an axial direction of the connecting passage for covering at least one half of an inner wall of the connecting passage, which is located at a position near an inner wall of the recess.

The present invention may be more fully understood from the following description of the preferred embodiments of the invention, together with the accompanying drawings.

DESCRIPTION OF PREFERRED EMBODIMENTS

Figure 1:
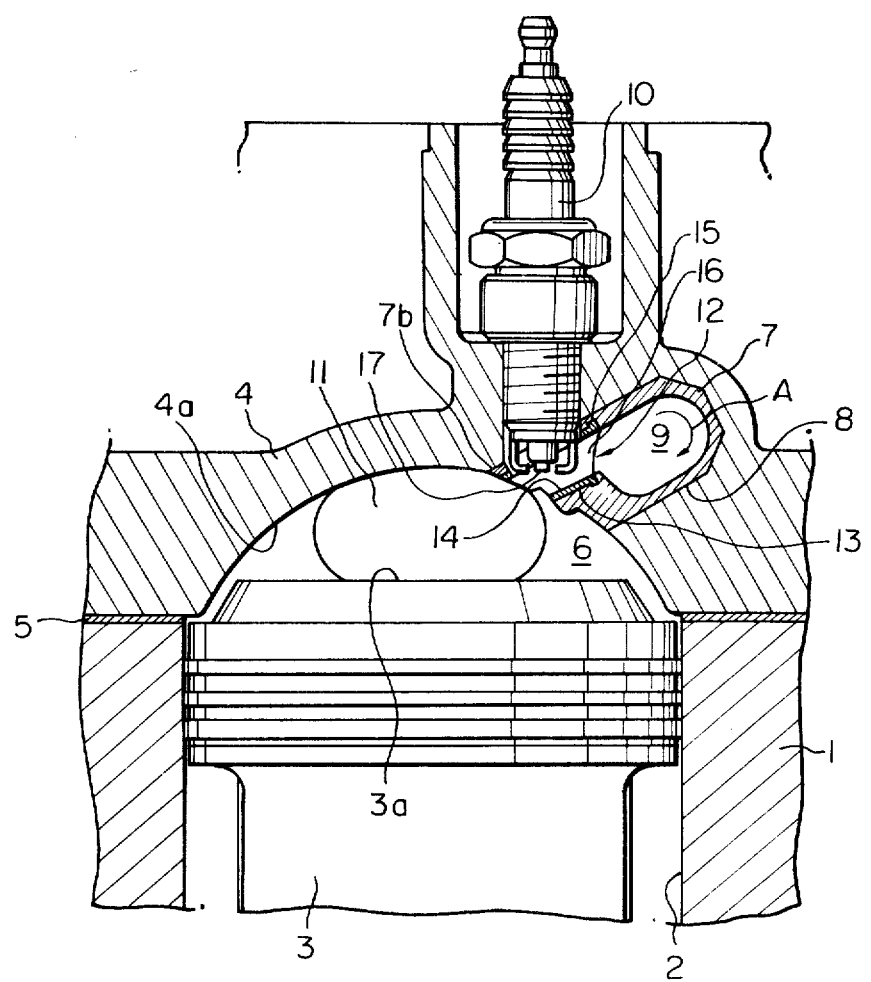
FIG. 1 is a cross-sectional side view of an embodiment of an internal combustion engine according to the present invention.

Referring to FIG. 1, 1 designates a cylinder block; 2 designates a cylinder bore formed in the cylinder block 1; 3 designates a piston reciprocally movable in the cylinder bore 2; 4 designates a cylinder head fixed onto the cylinder block 1 via a gasket 5; 6 designates a main combustion chamber formed between the top face 3a of the piston 3 and the inner wall 4a of the cylinder head 4; 7 designates an auxiliary chamber component press-fitted into a recess 8 formed in the cylinder head 4; 9 designates an auxiliary combustion chamber formed in the auxiliary chamber component 7; 10 designates a spark plug; and 11 designates an intake valve. A cylindrical hole 12 communicating the auxiliary combustion chamber 9 with the main combustion chamber 6 is formed in the auxiliary chamber component 7. An annular groove 13 is formed on the inner wall of the cylindrical hole 12, and a cylindrical hollow member 14 made of heat resistable material having a low thermal conductivity such as Invar or ceramics is arranged in the annular groove 13. On the other hand, the auxiliary chamber component 7 is made of stainless steel. The cylindrical member 14 is embedded in the auxiliary chamber component 7 at the same time when the auxiliary chamber component 7 is formed by the casting operation. Since the thermal conductivity of Invar is lower than that of stainless steel, the temperature of the cylindrical member 14 becomes considerably higher than that of the auxiliary chamber component 7 during the operation of the engine. However, since the coefficient of thermal expansion of Invar is considerably lower than that of stainless steel, there is a danger that the cylindrical member 14 may become dislodged from the cylindrical hole 12 into the main combustion chamber 6 during the operation of the engine. In order to avoid this danger, it is preferable that the cylindrical member 14 have an annular projection 15 formed on the upper end of the outer wall thereof. A connecting passage 16 is formed in the cylindrical member 14, and the electrode 17 of the spark plug 10 is located in the connecting passage 16. It is preferable that the electrode 17 of the spark plug 10 be arranged at a position near the opening of the connecting passage 16, which opens into the main combustion chamber 6. In addition, in order to cause a stable growth of the flame of the combustible mixture ignited by the spark plug 10, it is preferable to create a microturbulence in the connecting passage 16 without creating a large-scale turbulence. To this end, it is preferable that the inner wall of the cylindrical member 14 has rough surface such as a casting skin.

During operation, at the time of the intake stroke, a lean air-fuel mixture or an air-fuel mixture containing a large amount of the recirculated exhaust gas therein is introduced into the main combustion chamber 6 via the intake valve 11. Then, at the time of the compression stroke, the combustible mixture introduced into the main combustion chamber 6 is forced into the auxiliary combustion chamber 9 via the connecting passage 16; thus, a swirl motion shown by the arrow A in FIG. 1 is created in the auxiliary combustion chamber 9. In addition, when the combustible mixture in the main combustion chamber 6 is forced into the auxiliary combustion chamber 9, the residual exhaust gas created in the combustion of the preceding cycle and remaining around the electrode 17 of the spark plug 10 is completely scavenged by the combustible mixture flowing in the connecting passage 16. As mentioned above, since the cylindrical member 14 is made of a heat resistable material having a low thermal conductivity, the temperature of the inner wall of the cylindrical member 14 is maintained at a considerably high temperature. In addition, since the inner wall of the cylindrical member 14 has a rough surface, microturbulence is created in the connecting passage 16 at the time of the compression stroke. Consequently, the flame of the combustible mixture ignited by the spark plug 10 at the end of the compression stroke grows without being extinguished because the temperature of the inner wall of the cylindrical member 14 is high. In addition, microturbulence is created in the connecting passage 16 and, thereby a stable and rapid growth of the flame is brought about. This flame enters into the auxiliary combustion chamber 9 together with the combustible mixture flowing in the connecting passage 16; as a result, the flame ignites the combustible mixture in the auxiliary combustion chamber 9. Then, a strong burning jet is injected into the main combustion chamber 6 from the auxiliary combustion chamber 9. At this time, since the burning jet is not cooled by the inner wall of the connecting passage 16, a strong burning jet can be obtained.

Figure 2:
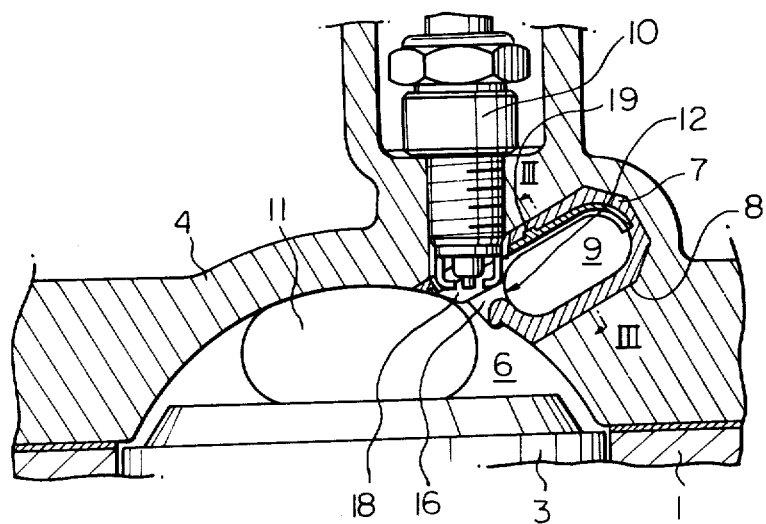
FIG. 2 is a cross-sectional side view of another embodiment according to the present invention.
Figure 3:
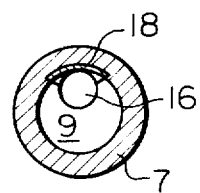
FIG. 3 is a cross-sectional view taken along the line III—III in FIG. 2.

FIGS. 2 and 3 show another embodiment according to the present invention. Referring to FIGS. 2 and 3, a heat insulation member 18 covering one half of the inner wall of the connecting passage 16, which is located at a position near the inner wall of the recess 8, and extending to the deepest interior of the auxiliary combustion chamber 9 is arranged in the cylindrical hole 12. This heat insulation member 18 is made of, for example, Invar and embedded in the auxiliary chamber component 7 at the same time when the auxiliary chamber component 7 is formed by the casting operation. It is preferable that the heat insulation member 18 have on its outer wall a projection 19 for preventing the heat insulation member 18 from becoming dislodged into the main combustion chamber 6. In this embodiment, since the stream of the flame of the combustible mixture ignited by the spark plug 10 is guided by the heat insulation member 18 having a high temperature until the stream reaches the deepest interior of the auxiliary combustion chamber 9, the flame is prevented from being extinguished. In addition, since microturbulence is created on the entire surface of the heat insulation member 18 located between the connecting passage 16 and the deepest interior of the auxiliary combustion chamber 9, a stable and rapid growth of the flame can be obtained.

Figure 4:
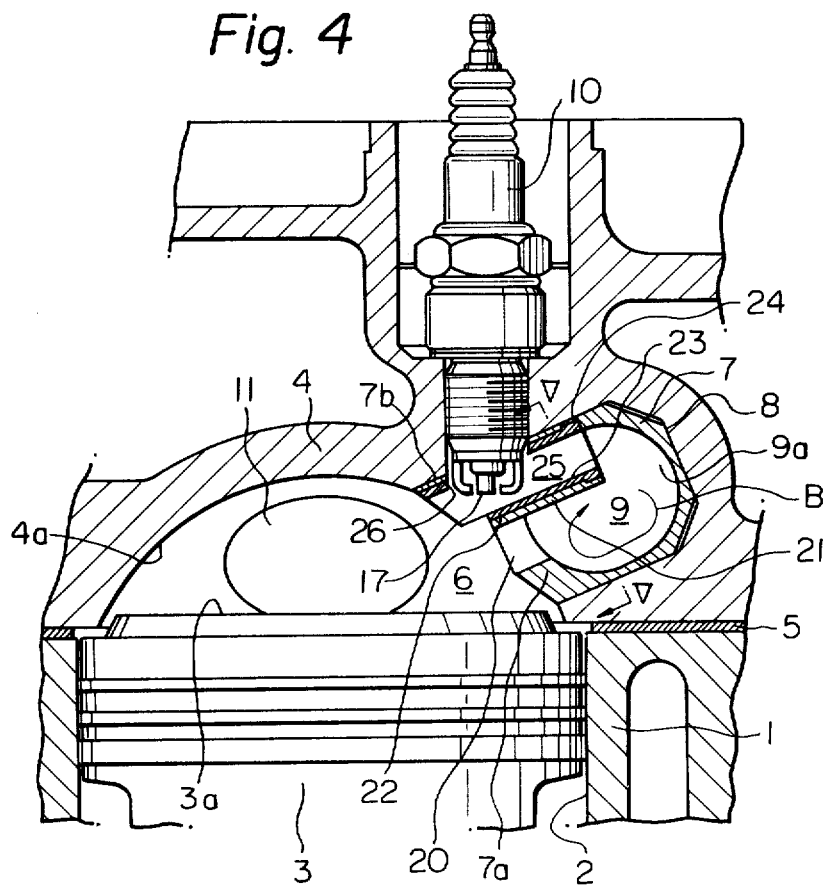
FIG. 4 is a cross-sectional side view of a further embodiment according to the present invention.
Figure 5:
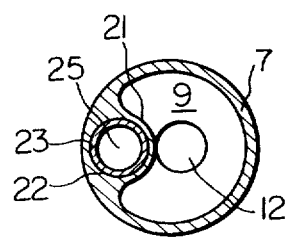
FIG. 5 is a cross-sectional view taken along the line V—V in FIG. 4.

FIG. 4 shows a further embodiment according to the present invention. In FIG. 4, similar components are indicated with the same reference numerals as those in FIG. 1. Referring to FIG. 4, a first connecting passage 20 is formed on the wall 7a of the auxiliary chamber component 7, which is exposed to the main combustion chamber 6. This first connecting passage 20 communicates the auxiliary combustion chamber 9 with the main combustion chamber 6. On the other hand, a semi-cylindrical wall 21 is formed in one piece on the circumferential wall 7b of the auxiliary chamber component 7 as shown in FIG. 4. As is shown in FIG. 4, the semi-cylindrical wall 21 is formed so as to extend to the deep interior 9a of the auxiliary combustion chamber 9. As is shown in FIGS. 4 and 5, a cylindrical hole 22 is formed in the semi-cylindrical wall 21, and a cylindrical member 23 made of, for example, Invar, is arranged in the cylindrical hole 22. This cylindrical member 23 is embedded in the auxiliary chamber component 7 at the same time when the auxiliary chamber component 7 is formed by the casting operation. In addition, it is preferable that the cylindrical member 23 have on its outer wall an annular projection 24 for preventing the cylindrical member 23 from dislodging into the main combustion chamber 6. The cylindrical member 23 forms therein a second connecting passage 25 communicating the main combustion chamber 6 with the deep interior 9a of the auxiliary combustion chamber 9. An opening 26 is formed in the cylindrical member 23 and the circumferential wall 7b of the auxiliary chamber component 7. The electrode 17 of the spark plug 10 projects into the second connecting passage 25 from the opening 26. It is preferable that the electrode 17 of the spark plug 10 be arranged at a position near the opening of the second connecting passage 25, which opens into the main combustion chamber 6. In addition, if the cross-sectional area of the second connecting passage 25 is excessively small, since a large part of the combustible mixture forced into the auxiliary combustion chamber 9 passes through the first connecting passage 20, a satisfactory scavenging operation of the space around the electrode 17 of the spark plug 10 cannot be obtained. In order to obtain the above-mentioned satisfactory scavenging operation, it has been proven that it is necessary to set the diameter of the second connecting passage 25 at more than 6 mm. In addition, as mentioned previously, in order to obtain a stable growth of the flame of the combustible mixture ignited by the spark plug 10, it is preferable to create a microturbulence without creating a large-scale turbulence and to form the second connecting passage 25 as a relatively long passage. In order to create a microturbulence in the second connecting passage 25, it is preferable that the inner wall of the cylindrical member 23 have a rough surface such as a casting skin. Furthermore, in order to avoid the generation of a large-scale turbulence, the cylindrical member 23 should be formed by a straight pipe, the inner wall of the deep interior of the auxiliary combustion chamber 9 should have a smoothly curved surface, and the second connecting passage 25 should be arranged to be smoothly connected to the inner wall of the deep interior of the auxiliary combustion chamber 9. In addition, it is preferable that the length of the second connecting passage 25 be 2 to 5 times longer than the diameter thereof. As is apparent from FIG. 4, in this embodiment, the volume of the auxiliary combustion chamber 9 is larger than that of the second connecting passage 25.

In this embodiment, at the time of the compression stroke, the combustible mixture in the main combustion chamber 6 is forced into the auxiliary combustion chamber 9 via the first connecting passage 20 and the second connecting passage 25. As a result, a swirl motion shown by the arrow B in FIG. 4 is created in the auxiliary combustion chamber 9. In addition, when the combustible mixture in the main combustion chamber 6 is forced into the auxiliary combustion chamber 9, the residual exhaust gas created in the combustion of the preceding cycle and remaining around the electrode 17 of the spark plug 10 is completely scavenged by the combustible mixture flowing in the second connecting passage 25. Since the temperature of the cylindrical member 23 is considerably high and the inner wall of the cylindrical member 23 has a rough surface, microturbulence is created in the second connecting passage 25 at the time of the compression stroke. Consequently, the flame of the combustible mixture ignited by the spark plug 10 at the end of the compression stroke grows in the second connecting passage 25 without being extinguished because the temperature of the inner wall of the cylindrical member 23 is maintained at a high temperature. In addition, microturbulence is created in the second connecting passage 25 as mentioned above and thus causes a stable and rapid growth of the flame in the second connecting passage 25. This flame enters into the auxiliary combustion chamber 9 together with the combustible mixture flowing in the second connecting passage 25 and then ignites the combustible mixture in the auxiliary combustion chamber 9. On the other hand, since the velocity of the combustible mixture flowing in the second connecting passage 25 is gradually reduced as the piston approaches to the top dead center, the flame in the second connecting passage 25 grows in the direction toward the main combustion chamber 6 and against the stream of the combustible mixture flowing in the second connecting passage 25, consequently, a relatively weak burning jet is injected into the main combustion chamber 6 from the second connecting passage 25.

As mentioned above, when the flame enters into the auxiliary combustion chamber 9, the flame ignites the combustible mixture located in the deep interior 9a of the auxiliary combustion chamber 9. Then, the flame of the combustible mixture thus ignited rapidly spreads over the entire space of the auxiliary combustion chamber 9 due to the presence of the swirl motion B. Since the unburned gas which has a heavy specific weight and thus cannot be easily moved exists in the region of the auxiliary combustion chamber 9, which is located at a position near the first connecting passage 20, the injection of a burning jet into the main combustion chamber 6 is started after the pressure in the auxiliary combustion chamber 9 is increased to a great extent. As a result of this, a strong burning jet is injected into the main combustion chamber 6 from the auxiliary combustion chamber 9. The combustion of the combustible mixture in the main combustion chamber 6 is started by the relatively weak burning jet injected from the second connecting passage 25. Therefore, the pressure in the main combustion chamber 6 is gradually increased. After this, the combustible mixture in the main combustion chamber 6 is rapidly burned by the strong burning jet injected from the first connecting passage 20.

Figure 6:
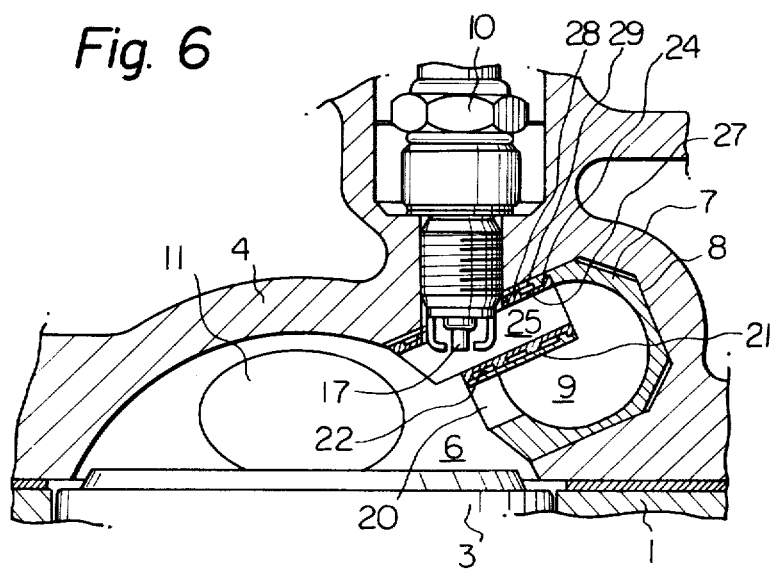
FIG. 6 is a cross-sectional side view of a still further embodiment according to the present invention.

FIG. 6 shows a still further embodiment according to the present invention. Referring to FIG. 6, a plurality of annular projections 28 are formed on the outer peripheral surface of a cylindrical member 27, wherein gaps 29 are formed between the cylindrical member 27 and the inner wall of the cylindrical hole 22. In this embodiment, since the gap 29 functions as an insulator, the cylindrical member 27 is maintained at a high temperature which is higher than that of the cylindrical member 23 shown in FIG. 4. As a result of this, it is possible to completely prevent the flame of the combustible mixture ignited by the spark plug 10 from being cooled and extinguished.

Figure 7:
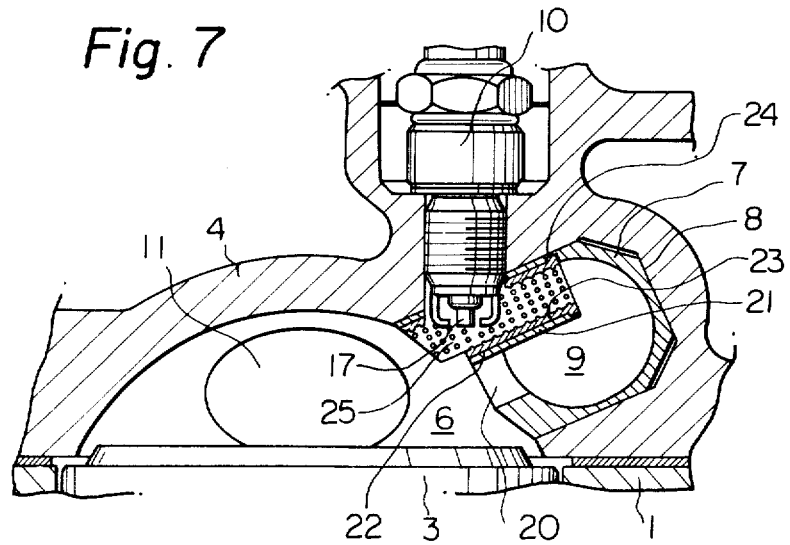
FIG. 7 is a cross-sectional side view of another still further embodiment according to the present invention.

FIG. 7 shows a still further embodiment according to the present invention. Referring to FIG. 7, a number of small projections are formed on the inner wall of the cylindrical member 23. In this embodiment, appropriate microturbulence is created in the second connecting passage 25 at the time of the compression stroke due to the presence of a large number of the small projections. As a result of this condition, the stable and rapid growth of a flame of the combustible mixture ignited by the spark plug 10 is ensured.

Figure 8:
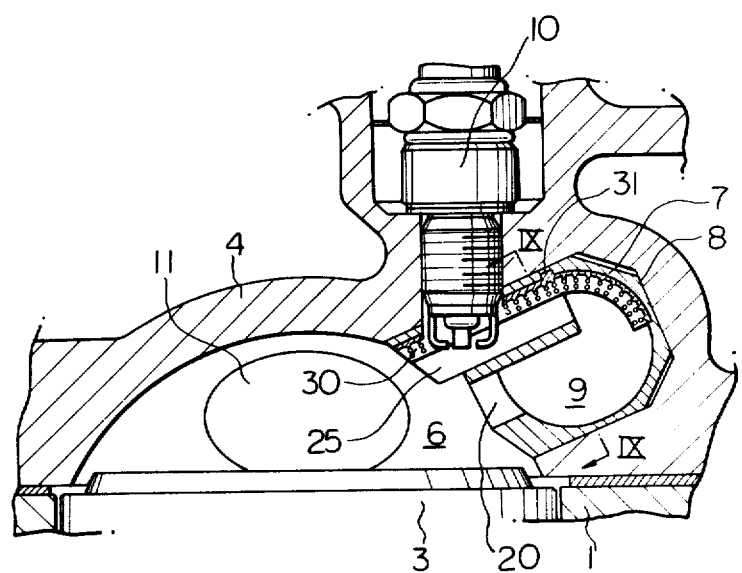
FIG. 8 is a cross-sectional side view of another still further embodiment according to the present invention.
Figure 9:
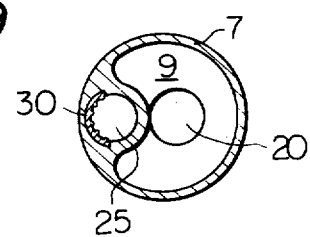
FIG. 9 is a cross-sectional view taken along the line IX—IX in FIG. 8.

FIGS. 8 and 9 show a still further embodiment according to the present invention. Referring to FIGS. 8 and 9, a trough member 30 covers half of the inner wall of the second connecting passage 25, which is located at a position near the inner wall of the recess 8 and has a relatively low temperature. The trough member 30 extending to the deepest interior of the auxiliary combustion chamber 9 is arranged in the second connecting passage 25. This trough member 30 is made of, for example, Invar, and embedded in the auxiliary chamber component 7 at the same time when the auxiliary chamber component 7 is formed by the casting operation. It is preferable that the trough member 30 have on its outer wall a projection 31 for preventing the trough member 30 from being dislodged into the main combustion chamber 6. A number of small projections are formed on the inner wall of the trough member 30. In this embodiment, since the stream of the flame of the combustible mixture ignited by the spark plug 10 is guided by a high temperature trough member 30 until the stream of the flame reaches the deepest interior of the auxiliary combustion chamber 9, it is possible to prevent the flame from being extinguished. In addition, since microturbulence is created over the entire surface of the trough member 30 located between the inside of the second connecting passage 25 and the deepest interior of the auxiliary combustion chamber 9, a stable and rapid growth of the flame can be obtained.

According to the present invention, even if a considerably lean air-fuel mixture or an air-fuel mixture containing a considerably large amount of the recirculated exhaust gas therein is used, since a satisfactory scavenging operation of the space around the electrode of the spark plug can be obtained, ease of ignition can be ensured. In addition, since a stable and rapid growth of the flame can be obtained, there is no danger that a misfire will occur. Furthermore, in the embodiments shown in FIGS. 4 through 9, since the combustion in the auxiliary combustion chamber is started from the deep interior of the auxiliary combustion chamber, a strong burning jet can be injected from the first connecting passage into the main combustion chamber. In addition, since a weak burning jet is injected from the second connecting passage before a strong burning jet is injected from the first connecting passage, a rapid increase in pressure in the main combustion chamber is prevented. As a result of this, there is no danger that a combustion noise will be generated. Furthermore, since a burning jet flowing in the second connecting passage in which the electrode of the spark plug is located is weak, there is no danger that erosion of the electrode of the spark plug will be caused and that preignition will occur.

While the invention has been described with reference to specific embodiments chosen for purposes of illustrations, it should be apparent that numerous modifications could be made thereto by those skilled in the art without departing from the spirit and scope of the invention.

What is claimed is:

1. An internal combustion engine including a main combustion chamber; a cylinder head positioned over one end of said chamber and having therein a recess opening into said chamber; an insert composed of a heat resistant material disposed in said recess and having therein an auxiliary combustion chamber and a connecting passage for communicating said auxiliary combustion chamber with said main combustion chamber; and a spark plug having a spark gap located in said connecting passage for forming a flame, wherein the improvement comprises:

a heat insulating liner for said connecting passage and for a portion of said auxiliary combustion chamber, said liner being formed as a separate member different from said insert and arranged to extend in abutting contact with and longitudinally of said connecting passage and said auxiliary combustion chamber, said liner covering at least one half of the wall surface of said connecting passage, which covered wall surface is located at a position near an inner wall of said recess and said liner covering only the portion of the wall of the auxiliary combustion chamber along which the flame grows extending away from the spark plug, said heat insulating liner serving to maintain the surface temperature of said connecting passage high enough to ensure flame growth in a combustible mixture ignited by the spark plug during operation of the engine.

2. An internal combustion engine as claimed in claim 1, wherein the spark gap of said spark plug is arranged in said connecting passage at a position near the end of said connecting passage which opens into said main combustion chamber.

3. An internal combustion engine as claimed in claim 1, wherein said heat insulating liner has a projection formed on the outer surface thereof for preventing said heat insulator from being dislodged into said main combustion chamber from said connecting passage.

4. An internal combustion engine as claimed in claim 1, wherein said connecting passage comprises a first passage and a second passage, said heat insulating liner being arranged on an inner wall of said second passage, the spark gap of said spark plug being arranged in said second passage.

5. An internal combustion engine as claimed in claim 4, wherein said first passage is arranged to communicate said main combustion chamber with an interior, of said auxiliary combustion chamber, which is located at a position near said main combustion chamber, said second connecting passage being arranged to communicate said main combustion chamber with a deep interior of said auxiliary combustion chamber, which is located at a position remote from said main combustion chamber.

6. An internal combustion engine as claimed in claim 5, wherein a semi-cylindrical wall is formed in one piece on a circumferential inner wall of said auxiliary combustion chamber and forms therein said second passage extending along the circumferential inner wall of said auxiliary combustion chamber.

7. An internal combustion engine as claimed in claim 5, wherein said second passage has a uniform cross section over the entire length thereof and is formed by a straight pipe.

8. An internal combustion engine as claimed in claim 1, wherein said heat insulating liner is formed by a thin member fixed onto the wall of said connecting passage.

9. An internal combustion engine as claimed in claim 8, wherein said heat insulating liner is made of Invar.

10. An internal combustion engine as claimed in claim 8, wherein said heat insulating liner is made of ceramics.

11. An internal combustion engine as claimed in claim 8, wherein said heat insulating liner covers the entire inner wall of said connecting passage.

12. An internal combustion engine as claimed in claim 8, wherein said heat insulating liner extends to the deepest interior of said auxiliary combustion chamber.

13. An internal combustion engine as claimed in claim 8, wherein said heat insulating liner has a rough inner wall.

14. An internal combustion engine as claimed in claim 13, wherein the inner wall surface of said heat insulating liner is formed as a casting skin.

15. An internal combustion engine as claimed in claim 13, wherein a number of small projections are formed in the inner wall of said thin member.

* * * * *